(12) United States Patent
Kinney et al.

(10) Patent No.: US 7,394,943 B2
(45) Date of Patent: Jul. 1, 2008

(54) METHODS, SOFTWARE, AND APPARATUS FOR FOCUSING AN OPTICAL SYSTEM USING COMPUTER IMAGE ANALYSIS

(75) Inventors: Patrick D. Kinney, Hayward, CA (US); Howard G. King, Berkeley, CA (US); Michael C. Pallas, San Bruno, CA (US); Mark Naley, Santa Clara, CA (US)

(73) Assignee: Applera Corporation, Foster City, CA (US)

( * ) Notice: Subject to any disclaimer, the term of this patent is extended or adjusted under 35 U.S.C. 154(b) by 613 days.

(21) Appl. No.: 10/881,868

(22) Filed: Jun. 30, 2004

(65) Prior Publication Data

US 2006/0001955 A1 Jan. 5, 2006

(51) Int. Cl.
*G06K 9/40* (2006.01)
(52) U.S. Cl. .................. 382/255; 348/356; 396/121
(58) Field of Classification Search ................ 396/121; 348/356; 382/255
See application file for complete search history.

(56) References Cited

U.S. PATENT DOCUMENTS

| | | | |
|---|---|---|---|
| 4,585,934 A | 4/1986 | French et al. | |
| 5,479,207 A | 12/1995 | Degi et al. | |
| 6,172,349 B1 | 1/2001 | Katz et al. | |
| 6,221,592 B1 | 4/2001 | Schwartz et al. | |
| 6,642,499 B1 | 11/2003 | Boni et al. | |
| 6,800,249 B2 * | 10/2004 | de la Torre-Bueno | 422/63 |
| 6,835,938 B2 * | 12/2004 | Ghosh et al. | 250/458.1 |
| 7,139,415 B2 * | 11/2006 | Finkbeiner | 382/128 |
| 2002/0172964 A1 | 11/2002 | Ippolito et al. | |
| 2003/0168577 A1 | 9/2003 | Zhang | |
| 2003/0184730 A1 * | 10/2003 | Price | 356/39 |
| 2004/0114823 A1 | 6/2004 | Smith et al. | |
| 2004/0217257 A1 | 11/2004 | Fiete et al. | |

FOREIGN PATENT DOCUMENTS

| | | |
|---|---|---|
| WO | WO 2002/059692 A1 | 8/2002 |
| WO | WO 2004/095360 A1 | 11/2004 |

OTHER PUBLICATIONS

International Search Report for application No. PCT/US2005/023305, mailed Oct. 21, 2005; along with Written Opinion of the ISA.
Tristan Buey and Didier Tiphene, *CorotCAM Calibration CCD Calibration Philosopy*, 1-10, Corot Workshop (Sep. 18, 2000).
*Guide to Streak Cameras*, 3-15, Hamamatsu Photonics K.K., Systems Division, Cat. No. SSCS1035E03 (1999).
Nathan Eric Howard, Opsci Application Note OAN-006, *Photon Transfer Technique*, 1-16, Opsci, Inc. (Feb. 19, 2002).
James R. Janesick, *Scientific Charge-Coupled Devices*, 1-13, Spie Press (2001).

* cited by examiner

*Primary Examiner*—Matthew C. Bella
*Assistant Examiner*—Dennis Rosario

(57) ABSTRACT

Methods, software, and apparatus for focusing an image in biological instrument are disclosed. Focusing elements are moved to various focus positions within a focus element travel range, and sample images are captured at the various focus positions. The sample images are resolved into subregions and an optimal focus position is determined based on the image intensity statistical dispersions within the identified subregions.

26 Claims, 8 Drawing Sheets

METHODS, SOFTWARE, AND APPARATUS FOR FOCUSING AN OPTICAL SYSTEM USING COMPUTER IMAGE ANALYSIS

The present teachings generally relate to methods, software, and apparatus useful in machine-vision-based focusing in imaging instrumentation, for example in biological instruments.

During imaging operations such as biological analysis involving nucleotide sequencing or microarray processing, photo-detectors are used to detect signals arising from labeled samples or probe features responsive to selected target analytes. These signals can take the form of electromagnetic emissions that are desirably analyzed to quantify signal intensities arising from labeled samples or probe features and are subsequently resolved to quantitatively or qualitatively evaluate the presence of a target analyte within a sample. Frequently, images associated with such biological analyses are of a very high-resolution to accommodate reading of very detailed images such as high-density microarrays. High-density microarrays can have densities of 4 binding sites or features per square millimeter or up to $10^4$ binding sites or features per square millimeter. Binding sites can be positioned on the substrate by pin spotting, ink-jetting, photolithography, and other methods known in the art of high-density deposition. Therefore, highly precise imaging is required. In order for image detectors to properly carry out such precise imaging, it is desirable that the optical systems associated with the image detectors be in sufficiently sharp focus to permit the image detectors to differentiate between discrete portions within a particular target sample being imaged.

However, optical systems of desirable cost and complexity, suffer from various types of optical aberrations that complicate the focusing process. A common optical aberration is field curvature aberration, which results in the situation where, for example, at one focal position, the center of an image will be clear and in sharp focus, but the edges of the image will be blurry and out of focus. Similarly under field curvature aberration, at other focal positions, the edges can be made sharp, while the center is blurred. This is because in common optical systems, the focal plane associated with an optical system is not flat but rather can be substantially spherical in configuration. There are also higher-order aberrations in optical systems which may be non-symmetrical with regard to focus. In some optical systems, an imaged feature size may increase faster on one side of sharp focus than on the other side.

Moreover, for various target samples that can be imaged in a biological instrument, the surface of the sample to be imaged varies in height as well. These varying heights within the sample result in differing distances from the optical system's focal plane. Because sharpness of focus is related to proximity of the target to the focal plane, these differences in height also create differences in focal sharpness at various points on the target sample.

Further, typical detectors used to image target samples are not one-dimensional point detectors but rather are two-dimensional and therefore subject to tip and tilt. Ideally the planar surface of an image detector would be perfectly parallel to the surface of the target sample. However, in real systems, there typically is some tip and/or tilt between the plane of the image detector and the surface of the target sample.

Frequently, imaging instruments employ imaging detection processes to image target samples such as very high-density microarrays. In various embodiments, microarray technology used in connection with the imaging instrument is such that each element of the microarray emits light proportional to the reactivity of the particular microarray element. The microarray is "read" by recording and analyzing images of the microarray array to quantify the light emitted by individual elements and thereby to identify analyte reactivity at each of the microarray elements.

In the case of a very high-density microarray, for example, lack of sharpness or blur in an image increases cross-talk between individual microarray element signals, and reduces the instrument's ability to differentiate among individual microarray elements. However, for a particular biological instrument, it is typically a requirement that the instrument be able to "read" (which is to say differentiate and measure the intensity of) substantially every region in the target sample. Accordingly, adequate focus is typically required in substantially every region of the target sample's recorded image.

To overcome instrument focusing challenges such as sample-to-sample thickness variations, intra-sample surface height variations, field curvature and other aberrations, and detector tip and/or tilt, it is necessary to adjust the focus position of the optical elements in an instrument to obtain a focal: position of sufficient sharpness to permit the instrument to operate properly. Moreover, for an imaging instrument to operate efficiently, it is desirable that the instrument be able to rapidly achieve focus. Therefore, there is a need for rapid, automatic focusing in machine-vision devices that can compensate for optical variations, variations in the surface heights of target samples, and detector tip and/or tilt.

SUMMARY

Images of a target sample are recorded while the target sample and/or an optical system associated with the target sample are moved through a series of positions bounding an ideal focus position. An analysis of the recorded images produces a map of the target sample's surface relative to the optical system's focus plane. In various embodiments, the target sample's surface height distribution is analyzed to select a substantially optimal focus position for the target sample. Additionally, the present teachings can provide information regarding target sample physical defects, thereby providing beneficial sample quality control procedures in addition to automatically focusing optics for imaging a target sample.

In various embodiments, the present teachings can provide a method for focusing an image in a biological instrument including moving a focusing element to a plurality of focus positions within a focusing element movement range, capturing a sample image of a target sample at the plurality of focus positions, resolving the sample image into a plurality of subregions, calculating image intensity statistical dispersion values within the plurality of subregions, identifying subregion focus positions for the plurality of subregions based on the calculated image intensity statistical dispersion values, and determining an optimal focus position based on the identified subregion focus positions, wherein the target sample is a high-density microarray.

In various embodiments, the present teachings can provide a method for focusing an image in a biological instrument including moving a focusing element to a plurality of focus positions within a focusing element movement range, capturing a sample image of a target sample at the plurality of focus positions, resolving the sample image into a plurality of subregions, calculating image intensity statistical dispersion values within the plurality of subregions, identifying subregion focus positions for the plurality of subregions based on the calculated image intensity statistical dispersion values, and determining an optimal focus position based on the identified subregion focus positions, wherein the target sample is a high-density biological sample container.

In various embodiments, the present teachings can provide a method for focusing an image in an imaging instrument including moving a focusing element to a plurality of focus positions within a focusing element movement range, scattering electromagnetic radiation off a surface of a target sample, capturing a sample image of the target sample at the plurality of focus positions based on the scattered electromagnetic radiation, resolving the sample image into a plurality of subregions, calculating image intensity statistical dispersion values within the plurality of subregions, identifying subregion focus positions for the plurality of subregions based on the calculated image intensity statistical dispersion values, and determining an optimal focus position based on the identified subregion focus positions, wherein the target sample is a high-density microarray.

In various embodiments, the present teachings can provide software for focusing an image in an imaging instrument including instructions to cause an electromechanical movement to move a focusing element to a plurality of focus positions within a focusing element movement range, instructions to cause a digital camera to capture a sample image of a target sample at the plurality of focus positions, instructions to cause an image processor to resolve the sample image into a plurality of subregions, and instructions to calculate image intensity statistical dispersion values within the plurality of subregions and to identify subregion focus positions for the plurality of subregions based on the calculated image intensity statistical dispersion values and to determine an optimal focus position based on the identified subregion focus positions, wherein the target sample is a high-density microarray or high-density biological sample container.

In various embodiments, the present teachings can provide an instrument for analyzing biological samples including an electromechanical movement coupled to and operable to move a focusing element to a plurality of focus positions within a focusing element movement range, a digital camera coupled to the imaging instrument operable to capture a sample image of a target sample at the plurality of focus positions, an image processor operable to resolve the sample image into a plurality of subregions, and a digital processor operable to execute instructions to calculate image intensity statistical dispersion values within the plurality of subregions and to identify subregion focus positions for the plurality of subregions based on the calculated image intensity statistical dispersion values and to determine an optimal focus position based on the identified subregion focus positions, wherein the target sample is a high-density microarray or high-density biological sample container.

BRIEF DESCRIPTION OF THE DRAWINGS

The skilled artisan will understand that the drawings, described below, are only intended for the illustration of various embodiments. The drawings are not intended to limit the scope of the present teachings in any way.

DESCRIPTION OF VARIOUS EMBODIMENTS

Figure 1:
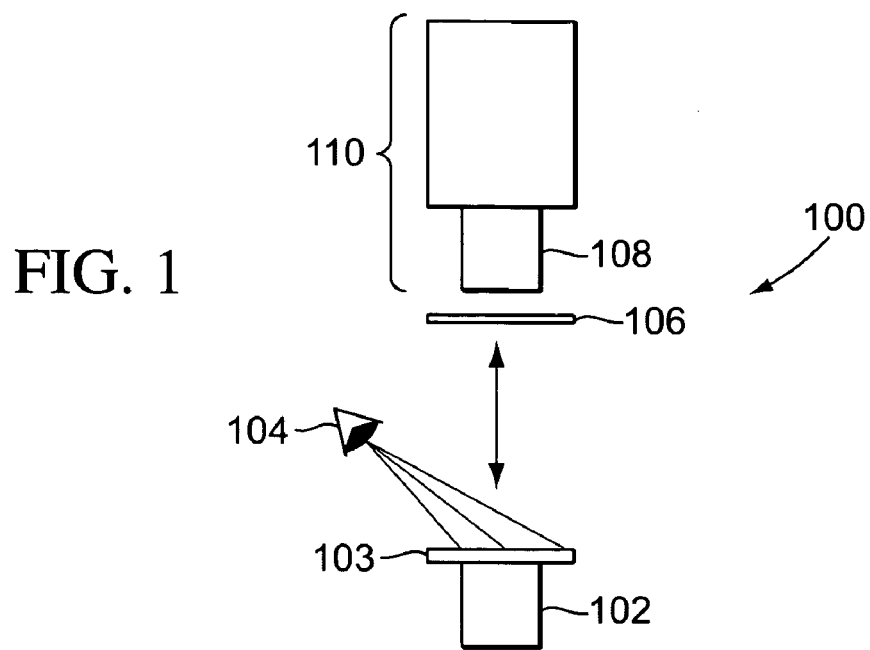
FIG. 1 illustrates a schematic diagram of an exemplary imaging instrument including an imaging detector, optics, and a focusing stage.

Reference will now be made in detail to some embodiments, examples of which are illustrated in the accompanying drawings. Wherever possible, the same reference numbers are used throughout the drawings to refer to the same or like parts.

In various embodiments, the present teachings provide the ability to image very high-density microarrays with sufficient resolution to differentiate individual microarray elements. Instruments consistent with the present teachings employ high-density image detectors, such as charge coupled devices (CCD) and high resolution imaging optics designed to maximize the number of array elements that can be measured in a particular image. In various embodiments, the optical system is designed to image the surface of a flat substrate on which the microarray has been "printed" using high density spotting technology. In various embodiments instruments image the microarrays using either or both of fluorescent (FL) or chemiluminescent (CL) modes of the microarrays.

In various embodiments, reaction plates contain biological reagents such as nucleic acid materials, primers, and probes, are imaged in connection with various biological assays to determine, for example a genetic sequence of a particular biological sample. It is understood that such reaction plates can be standard 96, 384, 1536 or greater well trays. Moreover, biological reactions taking place in custom multi-well trays can be imaged as well.

In various embodiments, capillary arrays such as those used in connection with electrophoretic separation systems are imaged to facilitate biological analyses performed in connection with the arrays of capillaries. In various embodiments microfluidic cards can be imaged as well. Similarly, arrays of tubes, in which biological analyses are performed can be imaged consistent with the present teachings.

Specific aspects of the present teachings are described below in the context of exemplary microarray reader embodiments. However, it is understood that the present teachings are not limited in scope to microarray reader embodiments but can be used in connection with imaging of any type of biological analysis technique including, but not limited to, those enumerated above. To clarify several terms used to disclose the present teachings, several definitions are set forth below.

The term "optical system" as used herein refers, in various embodiments, to lenses or other optics used to manipulate and/or focus electromagnetic radiation. However, the present teachings also apply to the manipulation of particles such as electrons for example using electromagnetic fields to manipulate the paths of electron beams in electron microscopy, in a manner analogous to lens refraction. Accordingly, as used herein "optical system" encompasses any system used to aid in focusing of electromagnetic radiation or particle beam(s) for the imaging of a target sample.

The term "target sample" as used herein refers to an object that is to be imaged. In various embodiments, the target sample is a high-density microarray, but it is understood that a target sample could be any object that is to be imaged by an imaging instrument consistent with the present teachings. Other target samples include other biological samples and any object to be imaged using any type of microscopy, including light microscopy and electron microscopy.

The term "focal plane" as used herein refers to the set of points in space at which distance the target sample is in substantially sharp focus. In various embodiments, the focal plane associated with the presently described optics is not two-dimensionally planar but rather resembles a portion of a sphere in its configuration.

The terms "subregion focus position," "subregion peak," or "subregion maximum" as used herein refer to the focus stage (or other optical system movable element) position corresponding to the sharpest focus for a particular subregion. In various embodiments, a subregion focus position is identified as the peak or maximum point on the subregion-image-intensity-spread to stage-position curve. In various embodiments, the subregion focus position is determined by recording images at a plurality of positions through the movement of the focus stage and calculating the standard deviation of pixel intensities within the subregion. In these various embodiments, the position at which the standard deviation of pixel intensities within a subregion is highest corresponds to the "subregion focus position."

The terms "extreme foci" or "extreme subregion foci" as used herein refer to the nearest and most distant subregion focus positions to the imaging device, within a particular window of focus positions.

The term "focus window" as used herein refers to the window of distances of the surface of the target sample from the imaging device in which substantially all regions of the target sample can be imaged with sufficient sharpness or clarity. The absolute size of the focus window can also be referred to as "depth of field" or "depth of focus," which is the range of target sample surface distances from the focal plane within which specific portions of the target sample can be imaged with an acceptable level of sharpness.

The term "statistical dispersion" as used herein refers to a measure of numerical diversity within a particular set of numbers. Statistical dispersion is zero for a set of identical numbers and increases as diversity among the set of numbers increases. Measurements of statistical dispersion include various examples. One measure of statistical dispersion is range, which is the difference between the highest and lowest number values in the set of numbers. Another measurement of statistical dispersion is "standard deviation," which is the square root of variance. Various algorithms are known for computing the standard deviation and variance of a set of numbers.

The term "image intensity statistical dispersion" as used herein refers to a measure of numerical diversity of pixel intensity values for a particular image or subregion within an image. Image intensity values can be obtained electrically from a pixel in a CCD or other detector or in connection with, for example, an electron beam detector in the case of electron microscopy.

FIG. 1 illustrates a schematic diagram of an exemplary imaging instrument 100 including an image detector assembly 110, optics 108, and a remotely controlled focus stage 102. In various embodiments, the focus stage 102 is a remotely controllable, motorized focus stage used to position a target sample on sample platform 103 relative to the focal plane of the imaging system's optics 108. In various embodiments, the focus stage 102 is positioned relative to the optics 108 and image detector such that predicted approximate focus positions are located near the focus stage's center of travel. In various embodiments, the focus stage 102 is provided with sufficient range of travel to ensure that the target sample can be moved from a location below the optimal focus position to a location above the optimal focus position. In various embodiments, additional focus stage travel is provided to account for sample-to-sample focus variations and/or different focal positions for different imaging modes. It is understood that positions of the lenses or detector could be adjusted rather than adjusting the position of the focus stage without departing from the teachings of the present invention.

As set forth below, in various embodiments, there is a relationship between the focus position for electromagnetic energy of different wavelengths. Therefore, in various embodiments, once the instrument is focused in one wavelength, a calibrated offset can be used to position the instrument to a focused position in another other wavelength. In various embodiments, focusing can be performed without an additional autofocus step by merely moving the focus stage 102 by the calibrated offset distance by which the wavelengths differ.

In connection with the imaging system 100 of FIG. 1, in various embodiments, autofocus operations are performed as follows. A microarray sample is placed atop the remotely controlled focus stage 102 on focus stage platform 103. The focus stage 102 is mounted relative to imaging optics 108. In various embodiments, the focus stage can be positioned atop a sample insertion stage that moves the sample from a load position to the imaging position. In various embodiments, to ensure proper focus in the instrument, autofocus processes consistent with the present teachings are performed prior to actually imaging the sample for biological analysis. As more fully set forth below, the autofocus processes involve recording and analyzing a series of images taken at different positions of the focus stage 102. The autofocus processes involve analyzing the images taken at the different positions to identify a position for the focus stage at which substantially all of the target image is sufficiently sharply focused to allow the instrument to operate properly. After autofocusing is complete, quantitative images of the sample are measured and analyzed to determine individual element signal levels associated with the sample for biological analysis.

Figure 2:
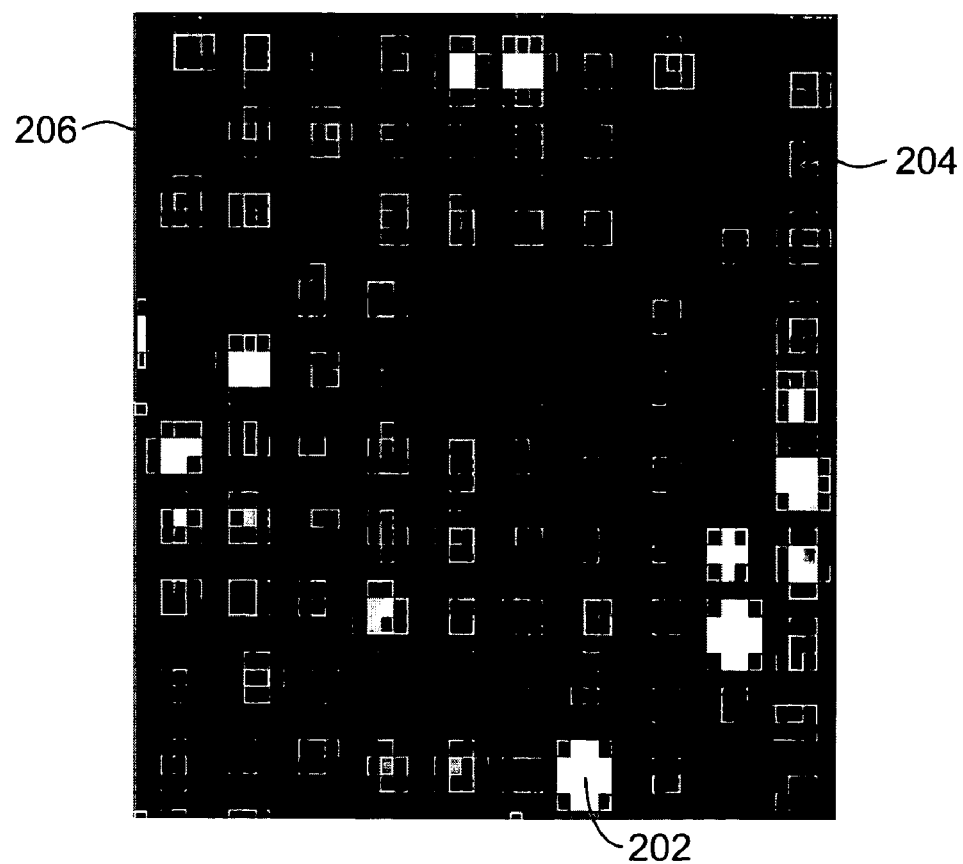
FIG. 2 illustrates a magnified view of a portion of an image produced by an exemplary microarray-reader instrument.

FIG. 2 illustrates a magnified view of a portion of an image produced by an exemplary microarray reader instrument. The image shows a regular pattern of bright points on a dark background. The light regions are created by light emitted from individual array elements. The dark regions correspond to the interstitial regions of the microarray substrate. Individual microarray elements are separated by a small number of pixels on a CCD camera. The uniformly spaced bright regions 202, 204 correspond to individual microarray elements. In various embodiments, as set forth below, computer image analysis is performed to determine a sufficiently sharp focus position to extract individual microarray elements from such an image.

Figure 3A:
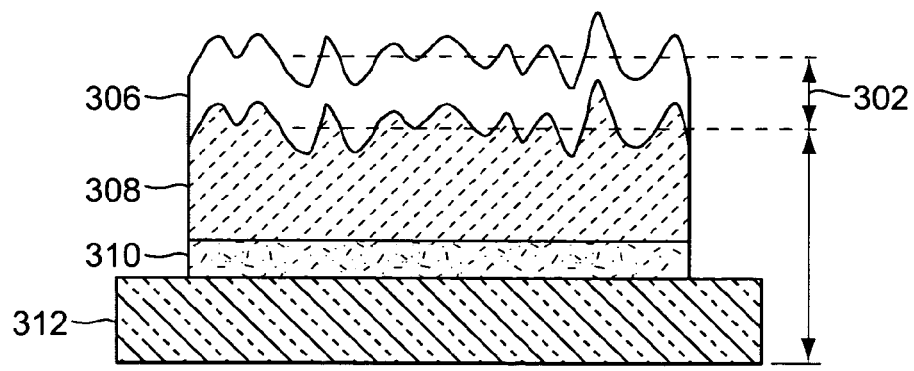
FIG. 3A illustrates a composite cross section of exemplary microarrays, illustrating sample-to-sample thickness variations.
Figure 3B:
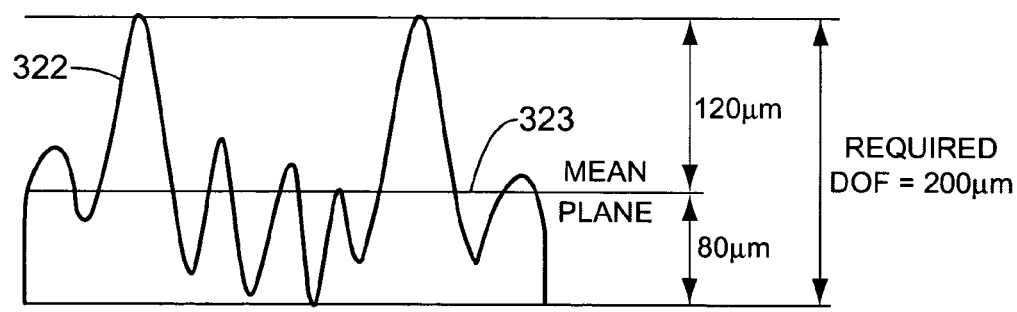
FIG. 3B illustrates an exemplary graph of inter-sample surface height variations.
Figure 3C:
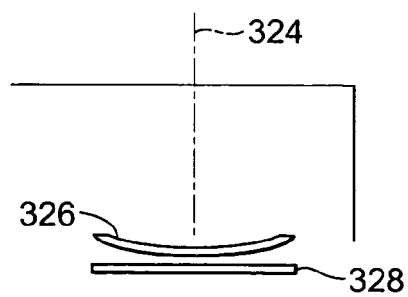
FIG. 3C illustrates an exemplary curved focal plane resulting from field curvature aberration.

FIGS. 3A-3C illustrate several of the factors affecting autofocus operations of the present teachings. Autofocusing processes consistent with the present teachings compensate for sample-to-sample thickness variations (FIG. 3A), inter-sample height variations (FIG. 3B), and field curvature effects (FIG. 3C). Due to field curvature of imaging optics, a flat microarray surface presents challenges in obtaining an image of the microarray in which each region of the image is perfectly sharp. Field curvature causes the optimal focus at a particular point to vary as a function of the distance from the optical axis (assuming a flat microarray substrate). If the focus is optimized on the center of the image, the edges of the image will have poorer focus. Inter-sample height variations present challenges in simultaneously optimizing focus on a sample's high and low points. Inter-sample height variations tend to be random in nature indicating a need to characterize the high and low points prior to imaging. Tip and/or tilt of the detector, and a non-flat sample substrate present challenges to having a substantially parallel sample and detector.

In various embodiments an optical system is selected such that the depth of focus is sufficiently large to accommodate field curvature and inter-sample height variations of the majority of typically encountered samples. After autofocus operations are performed, only portions of the target sample's surface are imaged at substantially sharp focus, but other regions are sufficiently close to focus to provide adequate imaging resolution. In various other embodiments substantially none of the points within the target sample are in substantially sharp focus, but nevertheless substantially all points within the target sample are sufficiently sharply focused to allow the imaging instrument to make an image of adequate quality. In various embodiments, the present teachings provide an autofocus algorithm that is capable of positioning the target sample such that no region of the target sample falls outside the optical system's depth of focus.

FIG. 3A illustrates a composite cross section of two exemplary microarrays, illustrating sample-to-sample thickness variations. It can be observed that sample 306 has a thickness that is greater than sample 308. Accordingly, an optimal focus distance for the two thicknesses would be offset by approximately the thickness variation 302 shown in FIG. 3A. Additionally, thickness variations in the adhesive 310 or in the thickness of the glass substrate 312 could result in sample-to-sample thickness variations that can be compensated for on a sample-by-sample basis by employing autofocus techniques consistent with the present teachings. In various embodiments, the sample-to-sample thickness variation 302 is in the range of approximately 0 μm to 400 μm.

FIG. 3B illustrates an exemplary graph of inter-sample surface height variations. The mean plane 323 can be calculated by averaging the value of the points along the inter-sample surface height variation curve 322. In this example, it can be observed that there are maximum points in the sample that are 120 μm above the mean plane 323 and minimum points that are 80 μm below the mean plane 323. Accordingly in order for the maximum and minimum points all to be sufficiently sharp, an optical system for imaging the sample would require a depth of focus of approximately 120+80 or 200 μm as shown in FIG. 3B.

FIG. 3C illustrates an exemplary curved focal plane resulting from field curvature aberration. An optical axis 324 is shown that typically passes through the center of lenses associated with the imaging instrument's optical system. Flat sample 328 is shown below focus plane 326. To adequately focus the surface of the flat sample 328, the flat sample 328 can be positioned upwardly into the focus plane 326.

Figure 4:
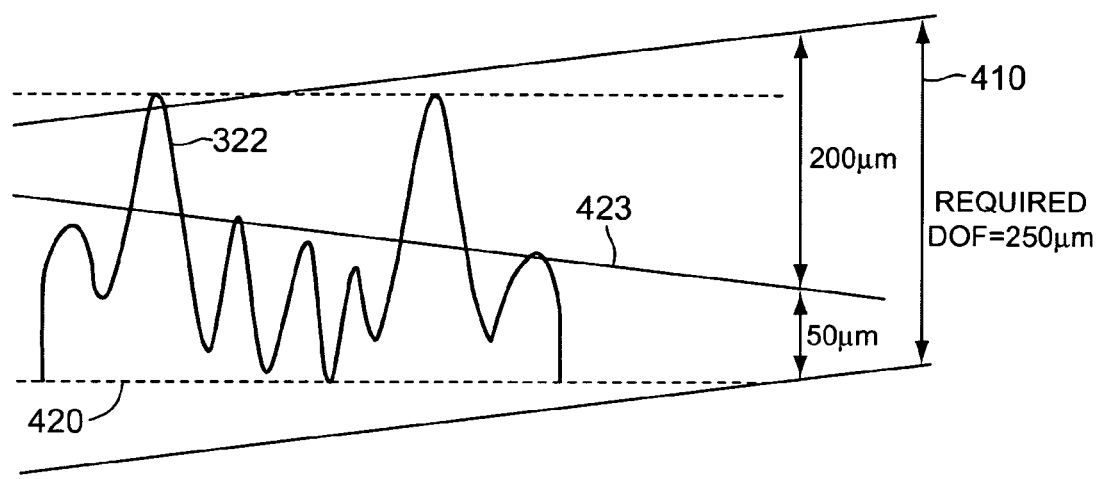
FIG. 4 illustrates an exemplary graph of inter-sample-surface height variations in the presence of image detector tip and/or tilt.

FIG. 4 illustrates an exemplary graph of inter-sample-surface height variations in the presence of image detector tip and/or tilt. In various embodiments, due to tip and/or tilt, a focus window 410 is parallel to the plane of the image detector, but tipped and/or tilted with respect to the target sample plane 420. In various embodiments, minor tip and/or tilt deviations can be compensated for in connection with autofocus operations consistent with the present teachings. It can be seen by comparing FIGS. 3B and 4 that given similar inter-sample surface height variation curves, the introduction of tip and/or tilt can require a greater depth of focus, for example if tilt causes the higher points of the surface to become closer to the image detector or if the lower points to become even further away.

Figure 5A:
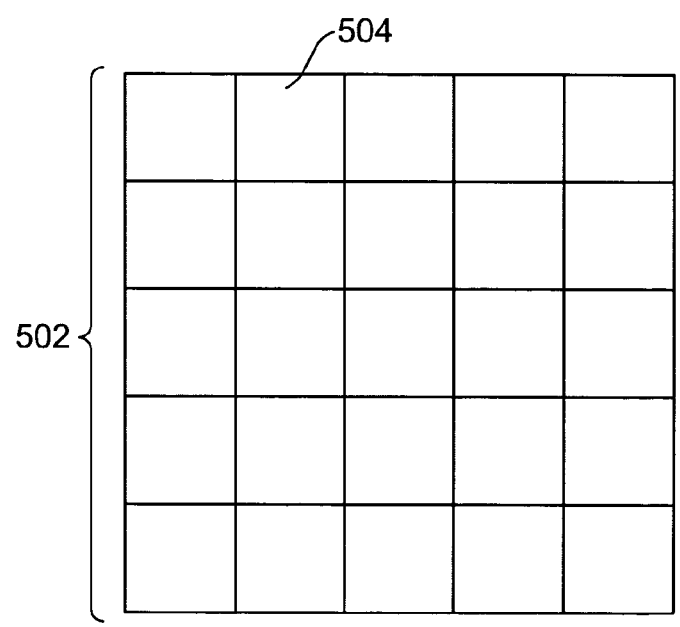
FIG. 5A illustrates an exemplary separation of a sample image into subregions.

FIG. 5A illustrates a sample calibration image 502 divided into 25 subregions. In various embodiments, the image detector is a CMOS or CCD-type image detector that provides a matrix of pixel intensity values corresponding to an intensity of electromagnetic radiation received at a pixel in the image detector. An indication of degree of sharpness in a particular subregion can be described by the degree of diversity of intensity values received at the pixels, or the pixel intensity statistical dispersion. In various embodiments, a quantitative measure of pixel intensity variation is the standard deviation of pixel intensity in a particular subregion of the target sample image. Accordingly, consistent with the present teachings, during autofocus operations, at various positions of the focus stage, target sample images are recorded and analyzed. To analyze the recorded images for generating the subregion foci, the recorded images are first divided into subregions 504.

In various embodiments, an image of dimensions approximately 2 k×2 k pixels in size image is divided into 25 subregions as shown in FIG. 5A. Binning is a process by which intensity values from two adjacent pixels in a CCD are combined to reduce the amount of data associated with a CCD image. In various embodiments 2×2 CCD camera binning is employed to reduce the amount of data necessary to be transferred from the CCD to expedite autofocus operations. It is understood that 4×4 (or higher level) binning could be employed without departing from the scope of the present teachings.

It is understood that larger pixel arrays can be employed without departing from the present teachings. Moreover, it is understood that any number of subregions can be employed without departing from the present teachings. In various embodiments, a 5×5 grid, yielding 25 subregions can be selected for speed-optimization purposes and because it provides a sufficiently large number of subregions to yield optimal focus positions, for example, even when there are bubbles in one part of the fluid of a target sample to be imaged and/or even if the image detector has some degree of tip and/or tilt with respect to the target sample. In various embodiments, four, nine, sixteen, or thirty-six subregions can be employed. It is also understood that subregions need not be symmetrical or of equal size. In various embodiments, subregion sizes are selected such that at least one illuminated microarray spot, for example a fiducial, is guaranteed to be in each subregion to provide contrast for performing image intensity statistical dispersion calculations. In various embodiments, subregions are sufficiently small that some subregions may not contain any fiducials or illuminated microarray spots. In these various embodiments, subregions not containing any contrasting pixels are discarded and not used for autofocus operations.

Figure 5B:
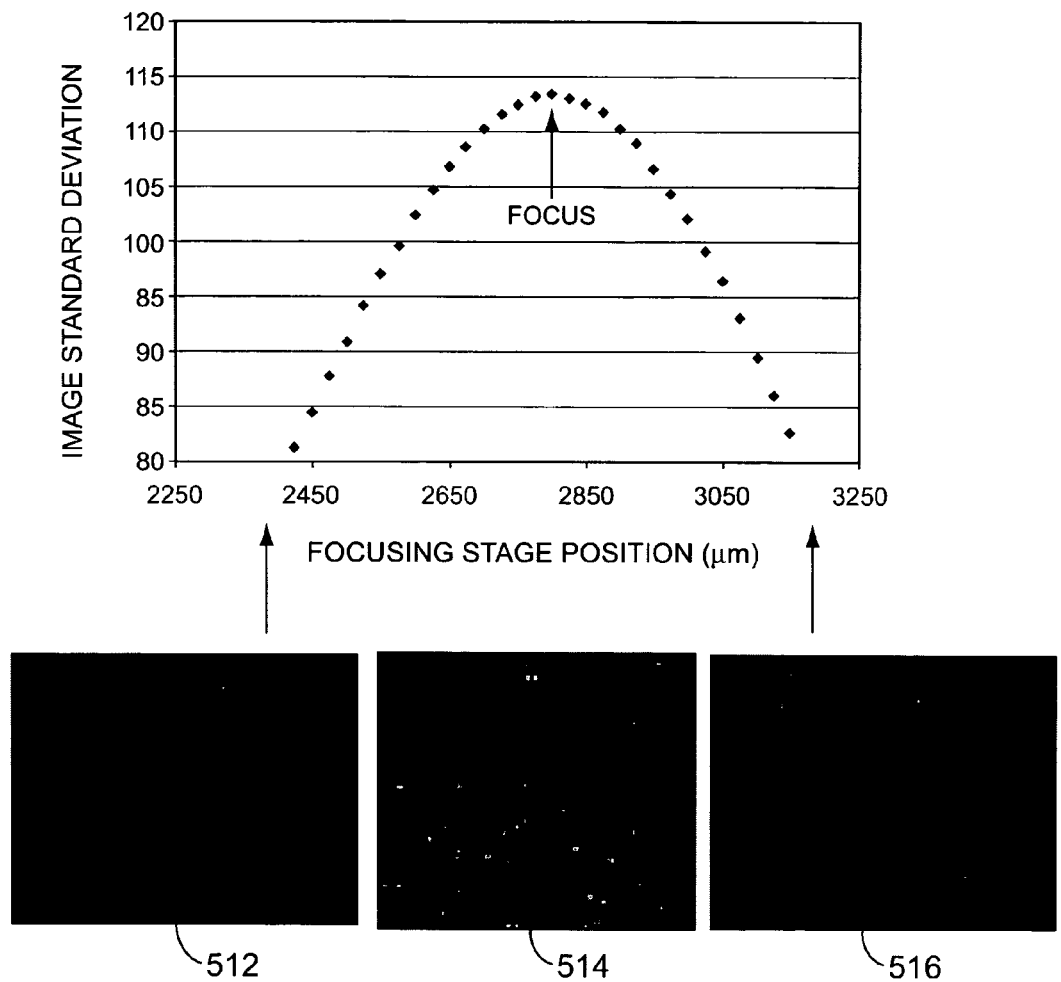
FIG. 5B illustrates a plot of image pixel intensity standard deviation versus focus position and corresponding exemplary images.

FIG. 5B illustrates a plot of image pixel intensity standard deviation versus focus position for an exemplary subregion of a sample image recorded for autofocus operations. It can be observed that when the image standard deviation is greatest, i.e. approximately 113, the subregion image is at its most sharply focused position. In this example subregion images 512 and 516, there is considerable blur caused by factors including field curvature aberration, tip and/or tilt, and/or differences in sample thickness. By contrast, subregion image 514, corresponding to the peak pixel intensity standard deviation is in substantially sharp focus.

Figure 6:
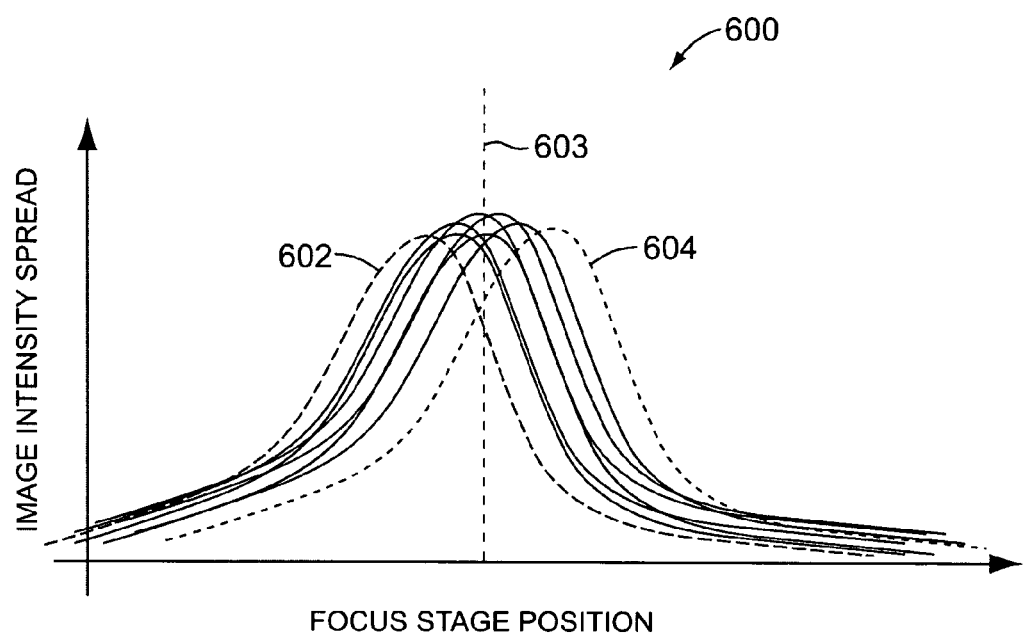
FIG. 6 illustrates plots of subregion image spread versus focus stage position. Extreme foci are identified as curves showing maximum and minimum focus positions.

FIG. 6 illustrates plots of subregion image variance versus focus stage position. Extreme foci are identified as curves showing maximum and minimum focus positions. In various embodiments, the autofocus algorithm determines the proper focus stage position by using the two extreme foci positions. If the distance between the extreme foci is less than the focus window, each region of the image can be adequately focused during imaging. In FIG. 6, subregion curve 602 represents the low extreme focus stage position, while subregion curve 604 represents the high extreme focus stage position. In various embodiments, the optimal focus position is chosen to be halfway in between the extreme foci, the focal position for the particular target sample being the average value of the extreme foci. In FIG. 6, the optimal focus position is focus stage position 603.

Figure 7A:
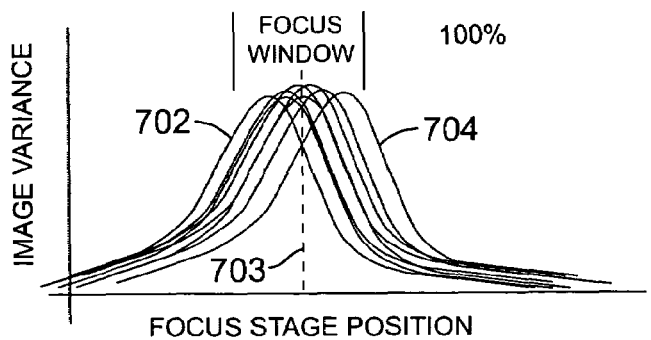
FIG. 7A illustrates a subregion focus curve pattern in which 100 percent of subregion foci can be located within the focus window.

FIG. 7A illustrates a subregion focus curve pattern in which 100 percent of subregion foci can be located within the focus window. As in FIG. 6, the focus stage can be positioned at the average of the maxima of the subregion focus curves that are the extreme foci, namely the midpoint of the maxima of curves 702 and 704.

Figure 7B:
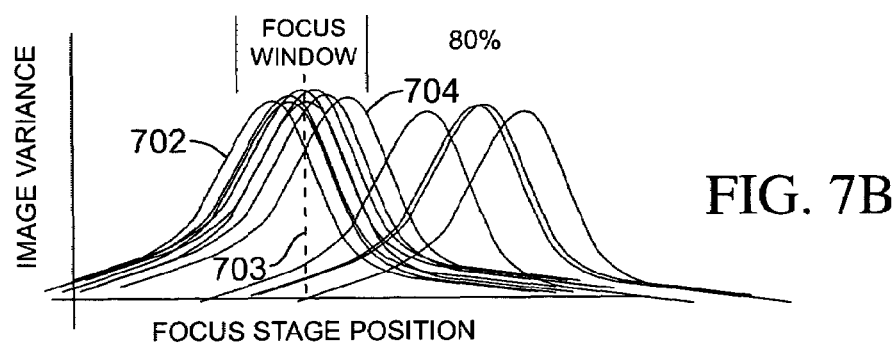
FIG. 7B illustrates a subregion focus curve pattern in which only 80 percent of the subregion foci can be located within a focus window.

FIG. 7B illustrates a subregion focus curve pattern in which only 80 percent of the subregion foci can be located within a focus window. Here the position of the focus stage is selected to be the midpoint of the extreme foci that fit within the focus window, maximizing the number of subregion peaks within the focus window. It is understood that the maximum number of subregion peaks in the focus window can be ascertained in any way including calculating the number of subregion peaks in the particular focus window as the focus window moves through the autofocus process and iterating through a set of possible focus window positions and counting the number of subregion peaks within each possible focus window in the set.

Figure 7C:
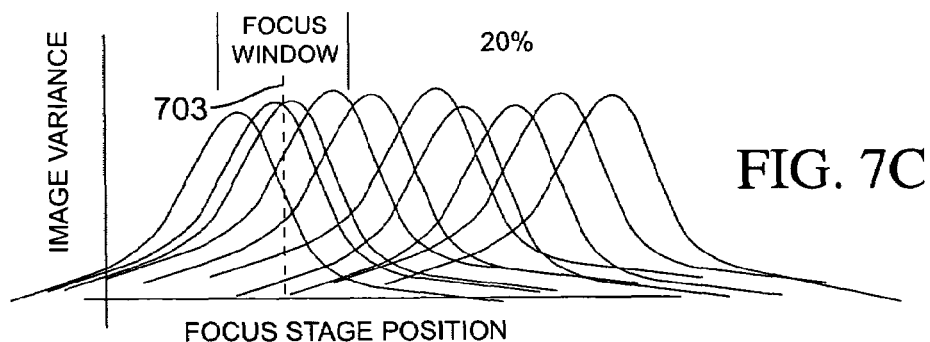
FIG. 7C illustrates a subregion focus curve pattern in which only 20 percent of subregion foci can be located within the focus window.

FIG. 7C illustrates a subregion focus curve pattern in which only 20 percent of subregion foci can be located within the focus window. In this case, the extreme foci are again selected such that the greatest possible number of subregion curve maxima are positioned within the focus window, nevertheless, the variation in position along the focus stage position axis indicates that the target sample cannot be accurately imaged. In various embodiments, an imaging instrument would generate an error indication, indicating that only portions of the target sample could be clearly imaged. In various embodiments, multiple images are made over a range of focal positions to separately image the subregions in sharp focus, and thereafter a composite image of the sharply imaged subregions is composed.

Figure 7D:
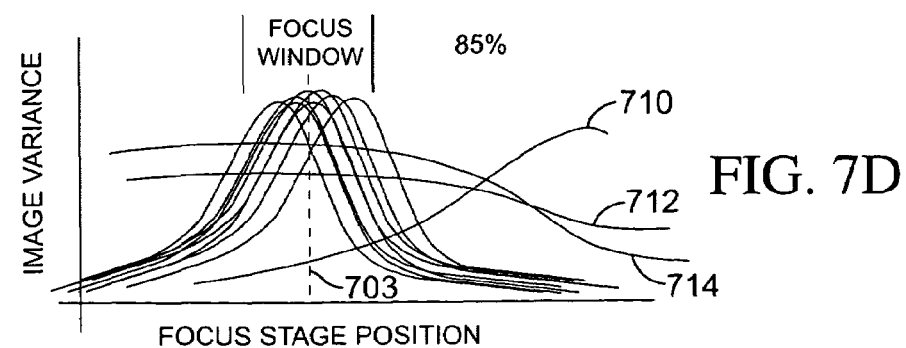
FIG. 7D illustrates a subregion focus curve pattern in which 85 percent of subregion foci can be located within the focus window and malformed subregion focus curves suggest a problem with subregion image areas.

FIG. 7D illustrates a subregion focus curve pattern in which 85 percent of subregion foci can be located within the focus window and malformed subregion focus curves suggest a problem with subregion image areas. It can be observed that outlier subregion curves 710, 712, and 714 indicate abnormalities in the subregions corresponding to curves 710, 712, and 714. In various embodiments, such abnormalities can indicate defects in the target sample such as bubbles in a sample liquid associated with a microarray. In various embodiments, the detection of such abnormalities will result in an error indication by the imaging instrument. In various embodiments, the outlier curves are ignored. The outlier curves can correspond to defects in the target sample that do not impede proper imaging of the target sample if the focus position corresponding to the non-defective subregions of the target sample is used.

In various embodiments, a microarray sample or other target sample comprises a relatively flat substrate submerged beneath a conditioning liquid. In various embodiments, the conditioning liquid is contained above the substrate without any top cover. In various embodiments, the conditioning liquid is positioned between the substrate and a transparent cover glass surface sealed at the edges of the substrate. Various defects can arise during sample preparation that interfere with instrument performance. Defects can include the presence of bubbles in the conditioning liquid, contamination of the cover glass surface or substrate, and various other irregularities that can affect image quality. The present teachings provide a means for detecting these defects prior to measurement thereby providing an opportunity for the user to correct the problem, or to flag the results associated with defective regions of the array.

Figure 8:
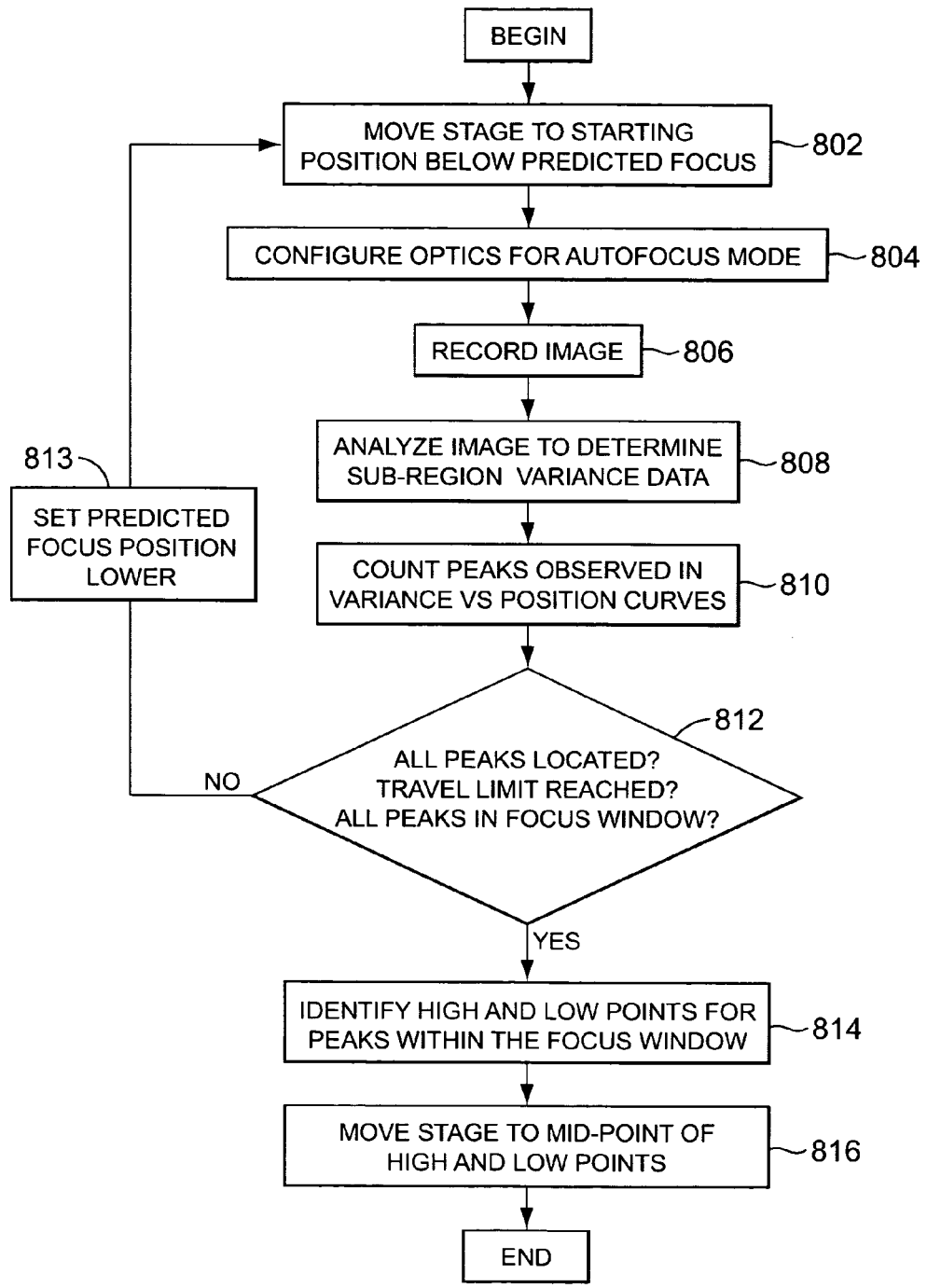
FIG. 8 illustrates an exemplary flow diagram for performing autofocus processes.

FIG. 8 illustrates an exemplary flow diagram for performing autofocus processes consistent with the present teachings. First the stage is moved to a starting position below a predicted position of focus (step 802). A predicted focus position can be obtained in any way, such as, for example an average focus position obtained by averaging a group of focus positions for a group of target samples of the type being autofocused. It is understood that the stage could also be positioned in other alternative positions, such as above a predicted focus. Next optics are configured for autofocus mode (step 804). In various embodiments, this involves positioning the filter between the stage and the optics so as to filter out photons being reflected from the slide that originate from the fluorescent excitation source. Next, an image of the target sample is recorded (step 806). Then the image is analyzed to determine subregion image statistical dispersion data (step 808). As set forth above, in various embodiments the subregion statistical dispersion data is obtained by dividing the image up into subregions and calculating the standard deviation of the intensity of pixels within the subregions. It is understood that any calculation representing image intensity statistical dispersion can be employed without departing from the scope of the present teachings. In various embodiments, analysis of the statistical dispersion versus position curves begins once two or more points have been acquired. With two points measured, the curves' slopes can be calculated permitting a prediction of whether a curve's peak lies above or below the focus positions that have been imaged (searched region). With three or more focal position points measured, each statistical dispersion curve is identified as either peaked or lying above or below the searched region. In various embodiments, at each focus position in the autofocus operation, the previously detected peak positions are considered in connection with the known size of the focus window of the optical system to determine an optimum placement of the focus window for the presently detected set of peaks.

Next, the peaks are counted that are observed in the variance to position curves calculated at various positions (step 810). Next it is determined whether all peaks are located, whether the focus travel limit is reached, whether continued searching for peaks is warranted, or whether the search region start position needs to be modified by returning to step 802 and continuing to search from a position further beneath focus. An error condition is identified when it is observed that the range of detected peaks exceeds one focus window. In this circumstance, further searching for peaks may or may not be warranted depending on operator preferences (step 812). User preferences can include a permitted number of percentage of peaks that are permitted to lie outside of the focus window. In various embodiments, this would allow a microarray to be imaged notwithstanding a bubble in the target sample or a dust particle on the surface of the target sample. Accordingly, it is understood that a focus result wherein fewer than 100% of the peaks are located within the focus window can be employed without departing from the scope of the present teachings. If none of these conditions are true, then in various embodiments, the predicted focus position is lowered (step 813) and the process continues at step 802. If the step 812 conditions are observed, then in various embodiments the high and low points for peaks within the focus window are identified (step 814). Further, once the high and low points for peaks within the focus window are identified in step 814 above, in various embodiments, the high and low points are averaged and the stage is moved to the average position as the optimal focus position (step 816). Other algorithms for determining optimum focus position based on the distribution of peaks within the focus window, for example, selecting the optimum focus position by averaging the peak positions can be employed without departing from the scope of the present teachings.

Figure 9:
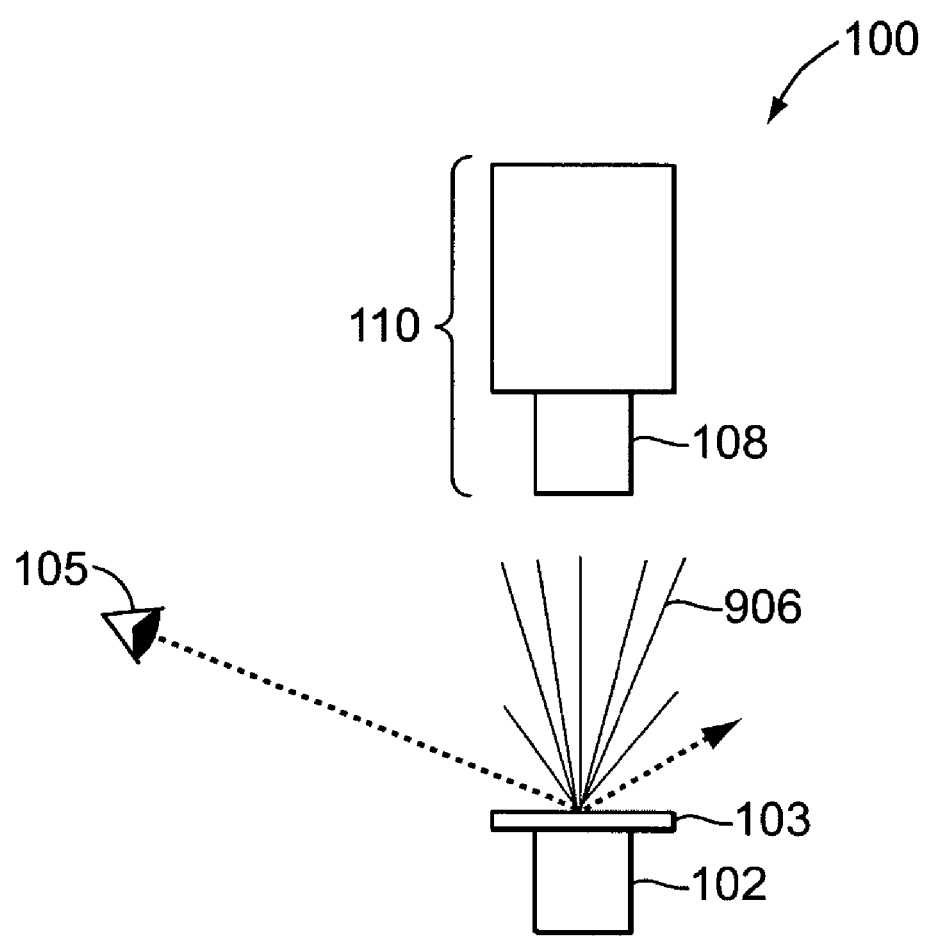
FIG. 9 illustrates an alternative embodiment using electromagnetic radiation to generate scattered light for producing an image of the target sample at an image detector.

FIG. 9 illustrates an alternative embodiment using electromagnetic radiation to generate scattered light for producing an image of the target sample at an image detector. An illumination source 105 is directed at the sample such that only non-specularly reflected (scattered) light is imaged by the detector 110. In this case, no emission filter is used so the detector 110 observes light scattered from the surface of the target sample on the focus stage platform 103. In the various embodiments illustrated in connection with FIG. 9, scattered light 906 is used to image a surface texture of the target sample. This surface texture imaging can advantageously be used, for example, in quality control operations on microarrays, whereby a nylon surface of the microarray is imaged to determine whether the surface height variations of the nylon fit within acceptable dimensions. It is understood that the various embodiments disclosed in connection with FIG. 9 can also be used, for example, in connection with light microscopy and/or photography generally.

In various embodiments, the present teachings can provide imaging for high-density biological sample container that can present similar challenges as high-density microarrays including sample-to-sample depth variations, inter-sample height variations, and field curvature effects. The container can include any of known containers in the biological field including reaction plates with high-densities of reaction wells such as 96, 384, 1536, 6144, etc. wells, custom multi-well reaction plates that are not standard consumables, i.e. SBS, a plurality of capillaries in an capillary array, such as a 96-capillary array, a plurality of individual sample tubes arranged in an array configuration such as tube strips, a plurality of individual sample locations in a microfluidic card, such as 96 or 384 chambers that can be vacuum or spin loaded.

The section headings used herein are for organizational purposes only and are not to be construed as limiting the subject matter described in any way.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a microarray" includes two or more microarray.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A method for focusing an image in a biological instrument, the method comprising:
   moving a focusing element to a plurality of focus positions within a focusing element movement range;
   capturing a sample image of a target sample at the plurality of focus positions;
   resolving the sample image into a plurality of subregions;
   calculating image intensity statistical dispersion values within the plurality of subregions;
   selecting a focus window delineating a desired degree of focus and determined on the basis of image intensity statistical dispersion versus focus element position;
   evaluating image intensity statistical dispersion values versus focus element position for the plurality of subregions; and
   determining an optimal focus position for the focusing element which maximizes the number of subregions residing within the focus window, wherein the target sample is a high-density microarray.

2. The method of claim 1, wherein the focusing element comprises a focus stage.

3. The method of claim 1 wherein the focusing element comprises at least one lens associated with the imaging instrument.

4. The method of claim 1, wherein the focusing element comprises an image detector associated with the imaging instrument.

5. The method of claim 1, wherein the plurality of focus positions comprises positions above and positions below a predicted optimal focal position.

6. The method of claim 1, wherein the high-density microarray comprises densities of 4 binding sites per square millimeter to $10^4$ binding sites per square millimeter.

7. A method for focusing an image in a biological instrument, the method comprising:
    moving a focusing element to a plurality of focus positions within a focusing element movement range;
    capturing a sample image of a target sample at the plurality of focus positions;
    resolving the sample image into a plurality of subregions;
    calculating image intensity statistical dispersion values within the plurality of subregions;
    selecting a focus window delineating a desired degree of focus and determined on the basis of image intensity statistical dispersion versus focus element position;
    evaluating image intensity statistical dispersion values versus focus element position for the plurality of subregions; and
    determining an optimal focus position for the focusing element which maximizes the number of subregions residing within the focus window, wherein the target sample is a high-density biological sample container.

8. The method of claim 7, wherein the container is a reaction plate comprising between 96 and 1536 wells.

9. The method of claim 7, wherein the container is a custom multi-well reaction plate.

10. The method of claim 7, wherein the container is a plurality of capillaries in an array.

11. The method of claim 7, wherein the container is a plurality of individual sample tubes arranged in an array configuration.

12. The method of claim 7, wherein the container is a plurality of individual sample locations in a microfluidic card.

13. The method of claim 7, wherein the plurality of subregions numbers between four and one-hundred.

14. The method of claim 7, wherein the sample image is substantially rectangular in configuration and wherein the plurality of subregions comprises substantially rectangular images, which are formed by separating the sample image into rows and columns of subimages.

15. The method of claim 7 wherein the sample image is captured by an image detector comprising a plurality of pixels and calculating the image intensity statistical dispersion values comprises calculating standard deviations of pixel intensity values associated with the plurality of pixels.

16. The method of claim 7, wherein determining the optimal focus position further comprises determining whether a predetermined percentage of the subregion focus positions fit within a focal window associated with the imaging instrument.

17. The method of claim 7 further comprising:
    identifying extreme foci within the subregion focus positions; and
    determining the optimal focus position based on the extreme foci.

18. The method of claim 17, wherein the optimal focus position is determined by calculating a midpoint between the extreme foci.

19. The method of claim 17, wherein the optimal focus position is determined by using an average of the subregion focus positions within a focal window associated with the imaging instrument.

20. The method of claim 17, further comprising:
    ignoring outlier positions in the subregion focus positions.

21. The method of claim 7, wherein determining the optimal focus position comprises determining the optimal focus position for received electromagnetic energy of a particular wavelength.

22. The method of claim 7, wherein determining the optimal focus position comprises determining the optimal focus position for received electromagnetic energy of different wavelengths.

23. A method for focusing an image in an imaging instrument, the method comprising:
    moving a focusing element to a plurality of focus positions within a focusing element movement range;
    scattering electromagnetic radiation off a surface of a target sample;
    capturing a sample image of the target sample at the plurality of focus positions based on the scattered electromagnetic radiation;
    resolving the sample image into a plurality of subregions;
    calculating image intensity statistical dispersion values within the plurality of subregions;
    selecting a focus window delineating a desired degree of focus and determined on the basis of image intensity statistical dispersion versus focus element position;
    evaluating image intensity statistical dispersion values versus focus element position for the plurality of subregions; and
    determining an optimal focus position for the focusing element which maximizes the number of subregions residing within the focus window, wherein the target sample is a high-density microarray.

24. The method of claim 23, wherein the target sample comprises a microarray.

25. The method of claim 24, wherein the scattered light from fiducials associated with the microarray is used to determine the optimal focus position.

26. An instrument for analyzing biological samples, the instrument comprising:
    an electromechanical movement coupled to and operable to move a focusing element to a plurality of focus positions within a focusing element movement range;
    a digital camera coupled to the imaging instrument operable to capture a sample image of a target sample at the plurality of focus positions;
    an image processor operable to resolve the sample image into a plurality of subregions; and
    a digital processor operable to execute instructions to calculate image intensity statistical dispersion values within the plurality of subregions and to select a focus window delineating a desired degree of focus and determined on the basis of image intensity statistical dispersion versus focus element position and further operable to execute instructions to evaluate image intensity statistical dispersion values versus focus element position for the plurality of subregions based on the calculated image intensity statistical dispersion values and to determine an optimal focus position for the focusing element which maximizes the number of subregions residing within the focus window,
    wherein the target sample is a high-density microarray or high-density biological sample container.

* * * * *